April 30, 1935.    O. T. SMITH    1,999,547
DISPLAY FOLIO
Filed Feb. 21, 1934
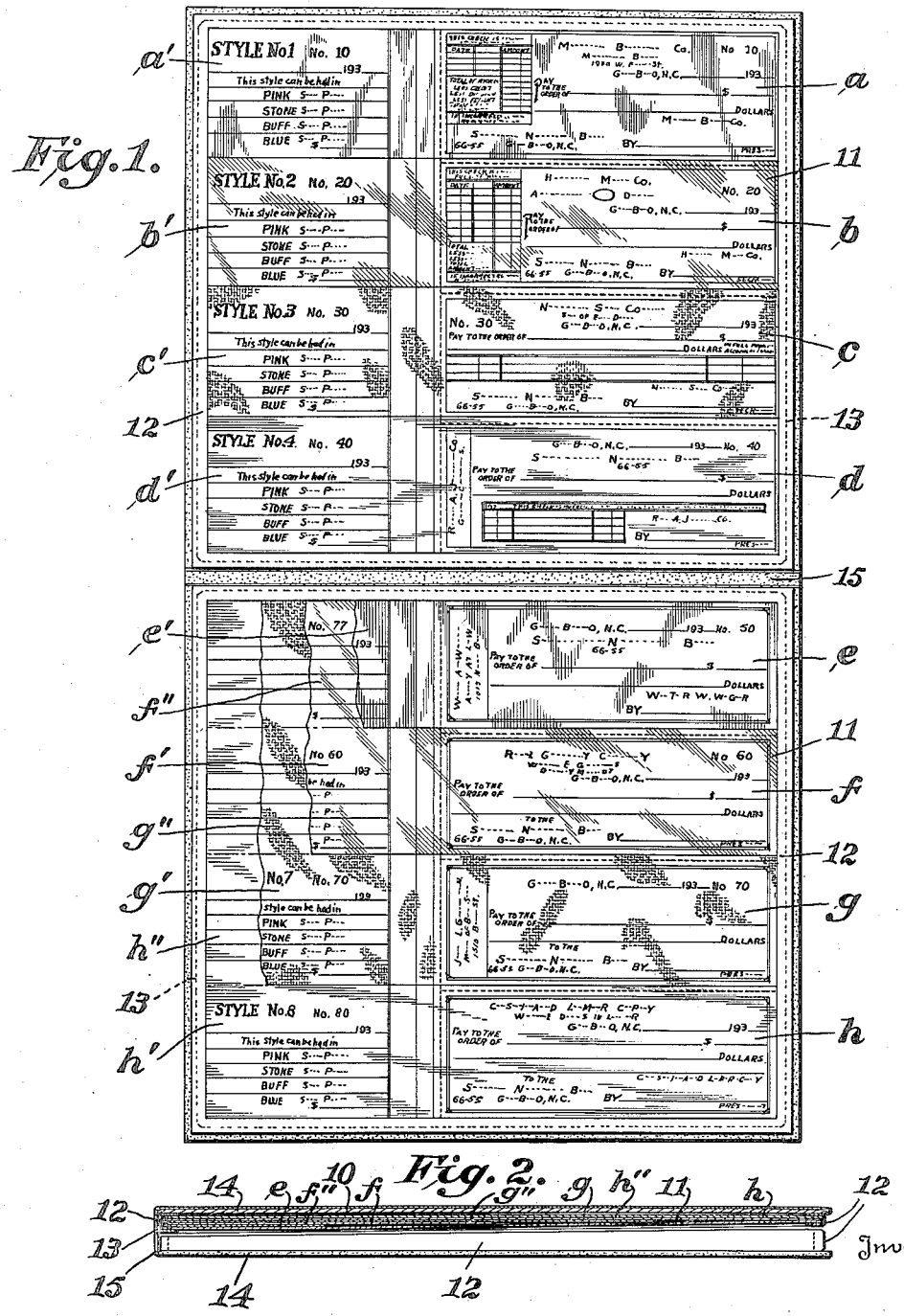
Inventor:
Oscar T. Smith,
By Spear, Donaldson + Hall
Attorneys.

UNITED STATES PATENT OFFICE 1,999,547

DISPLAY FOLIO

Oscar Turner Smith, Baltimore, Md.

Application February 21, 1934, Serial No. 712,414

2 Claims. (Cl. 206—82)

This invention relates to a display folio and more particularly to a folio for exhibiting bank checks obtainable in a variety of printed designs and colors.

Banking practice has developed bank checks of a variety of different characters, each especially suitable for a particular type of transaction or adapted to the taste of the user. These checks may differ as to the arrangement of their printing and as to their color, and ordinarily each printed style of check is obtainable in the same list of colors. Establishments supplying these checks have found it difficult to present their merchandise in a conveniently examinable manner, due to the large number of checks from which selection may be made.

An object of the present invention is to facilitate the selection of an appropriate check from among those offered.

A further object of the invention is to protect the checks against damage and soiling.

Other objects will appear from the following description when considered in conjunction with the accompanying drawing showing a preferred embodiment of the invention.

In the drawing:

Fig. 1 shows the folio opened.

Fig. 2 shows a side view of the folio closed, a part thereof being in section.

Considering first the group of bank checks $a$, $b$, $c$, and $d$ and their attached stubs $a'$, $b'$, $c'$, $d'$ it will be noted that they occupy a side by side relation with their long edges juxtaposed. Each of these checks is intended to differ from the other checks of the group both as to style of printed design and as to color. The difference between the checks as to style may best be ascertained by reference to the drawing which shows by way of example, styles found in common use. The color of each check may be due to the paper itself or to the safety marks ordinarily printed thereon. It will be understood that the particular color of any check shown is independent of its particular style, the object in this respect being to have all the colors shown in which each style check is available. For example the checks $a$, $b$, $c$ and $d$ may be pink, stone, buff and blue, respectively.

Additional obtainable styles or colors of checks, may form a separate group. As shown, the checks $e$, $f$, $g$ and $h$ and their respective stubs, are of a different printed design than those of the first group although the colors of the first group are duplicated. To facilitate selection of a proper check, the checks of each group may be of a general type. For example checks $a$, $b$, $c$ and $d$ are of the voucher type, while checks $e$, $f$, $g$, and $h$ omit this provision and are representative of the forms commonly used by banks and commercial firms.

Each check thus serves the double purpose of illustrating one of the several styles available and one of the colors in which all of the checks are separately obtainable. With the display of checks before him, a person selecting a check may first examine the checks as to style, to choose the most appropriate printed design. Then the same checks may be re-examined as to color to determine which is most pleasing. It will be understood that the check so determined upon has two distinct qualities, namely (1) color, and (2) style such as printed design. Each of these qualities of the finally determined check is one of a variety from which it has been chosen. That is, under each of the two qualities a multiplicity of variations is possible. In this manner the qualities of the desired check are ascertained.

By having all styles and colors immediately before the person and all visible at once, time in turning from one check to another is saved. Likewise, the mental effort required to keep in mind the nature of preceding checks, is minimized and full devotion can be given to an analysis of the exhibited checks. The actual benefit of this arrangement is perhaps best understood when it is realized that if each style of check is shown in all the available colors the total checks required is the product of the number of styles and the number of colors obtainable, whereas in the present case the number of checks required, is only the larger of these factors and they are all simultaneously displayed.

While the checks may be assembled side by side as separate strips each having the width of one check, it is preferable that successive checks have an attached portion extending beneath the preceding check, as shown in Fig. 2 at $f''$, $g''$ and $h''$. Conveniently, this attached portion may be other checks of a sheet of checks when they are supplied in this manner. In this manner, the checks with their attached portions are in effect superimposed on one another and the attached portion of each under check supports those above. Furthermore, the checks tend to lie flat, and unpleasantly appearing gaps do not occur between the checks. In assembling the checks this attached portion assists in aligning the checks since the extreme ends of the attached portions meet at a common point.

The checks of each group may be placed upon a backing 10 of any suitable material, and be overlaid by a sheet of transparent material 11. An edging 12 extending around the periphery of these assembled parts and fastened to them as by stitching 13, secures the parts in place and forms a border around the checks. The backing of each group may be attached to a heavy base 14 and as shown two bases may be secured together along one edge by a flexible strip 15 which serves as a hinge.

When the folio formed by the connected backs is closed, the checks and transparent sheet are protected against the injury by the heavy material of the backs. All of the checks are displayed when the folio is opened, and it is desirable that all checks of both groups be so arranged as to be readable from one direction when the folio is open.

While the invention has been shown and described in connection with checks, it will be understood that it is not limited to this particular article, but that it is equally as well adapted for use with articles having a similar nature, as for example, letter heads, deposit slips, bank statements and similar flat items.

What is claimed is:

1. An article of manufacture for exhibiting bank checks of dissimilar printed designs and dissimilar colors comprising a plurality of checks arranged laterally of each other, each check having an attached section extending beneath all of the checks preceding it whereby gaps between adjoining checks are avoided and the bottom draft and its attached section form a base for the other checks, adjoining checks being of different printed designs or different colors, and means for retaining said checks in assembled relation.

2. An article of manufacture for exhibiting bank checks of dissimilar printed designs and dissimilar colors comprising a plurality of checks arranged side by side, each of said checks having an attached section extending beneath all of the checks preceding it, the extreme ends of said attached sections meeting at the remote edge of the uppermost check for facilitating alignment of the checks, adjoining checks being of different printed designs or different colors, and means for retaining said checks in assembled relation.

OSCAR TURNER SMITH.